(No Model.)

T. G. & J. H. THRELKELD.
HAY RAKE AND LOADER.

No. 570,071. Patented Oct. 27, 1896.

Witnesses:
R. H. Orwig,
C. F. Wilcox.

Inventors: Thomas G. Threlkeld,
and John H. Threlkeld,
By Thomas G. Orwig, Attorney.

THE NORRIS PETERS CO., PHOTO-LITHO., WASHINGTON, D. C.

UNITED STATES PATENT OFFICE.

THOMAS G. THRELKELD AND JOHN H. THRELKELD, OF LIBERTY CENTRE, IOWA.

HAY RAKE AND LOADER.

SPECIFICATION forming part of Letters Patent No. 570,071, dated October 27, 1896.

Application filed June 3, 1895. Serial No. 551,577. (No model.)

*To all whom it may concern:*

Be it known that we, THOMAS G. THRELKELD and JOHN H. THRELKELD, citizens of the United States of America, residing at Liberty Centre, in the county of Warren and State of Iowa, have invented an Improved Hay Rake and Loader, of which the following is a specification.

Our object is to facilitate taking hay away from the rake-teeth, as required, to prevent clogging and to elevate the hay to a wagon as rapidly as it is gathered in the field, as the wagon and machine are jointly advanced, and also to facilitate elevating the rake-teeth and making the machine inoperative at pleasure by a person on the wagon.

Our invention consists in the arrangement and combination of a rake, a series of flanged and toothed belt-wheels, a series of endless toothed belts, and means for elevating the rake and making the elevator mechanism inoperative, with a carriage, as hereinafter set forth, pointed out in our claims, and illustrated in the accompanying drawings, in which—

Figure 1:
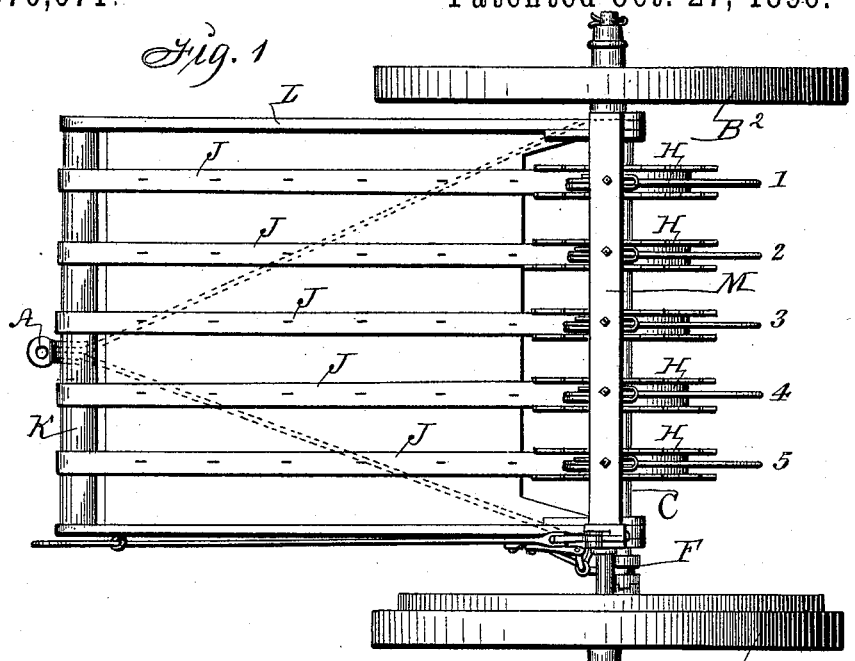
Figure 3:
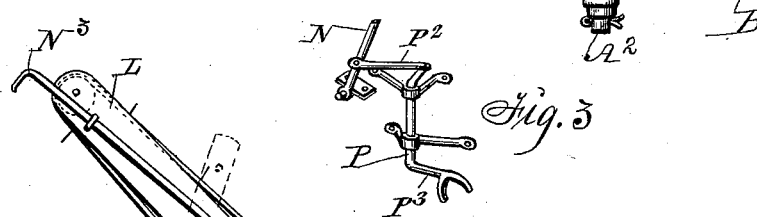
Figure 2:
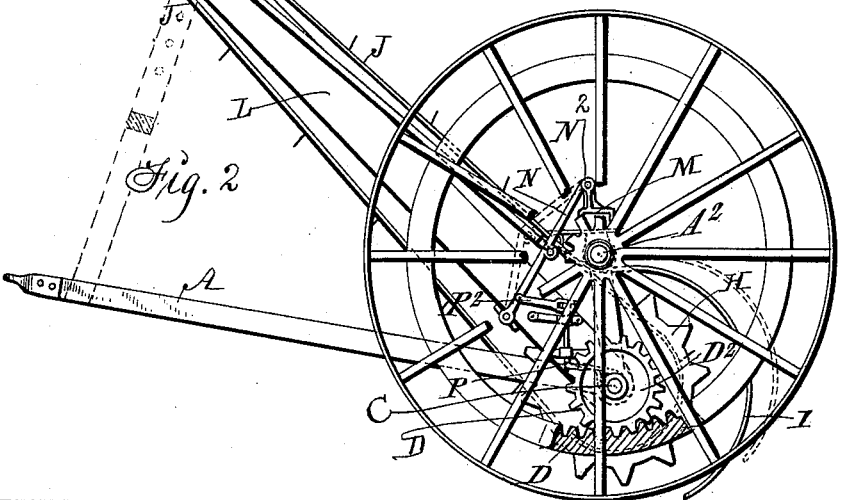

Figure 1 is a top view, and Fig. 2 a side elevation, of our invention, showing the positions of the different operative parts relative to each other and the carriage upon which they are combined. Fig. 3 is a perspective view of the device for simultaneously elevating the rake and throwing the elevator mechanism out of gear and also for lowering the rake and placing the elevator in gear.

In the drawings, the letter A is used to designate a carriage-frame suspended from an axle $A^2$, that has traction-wheels on its ends.

C is a rotating axle in bearings fixed to the frame A in a plane below the axle $A^2$ and detachably connected with the axle A by means of an internal gear D, fixed to the spokes of one of the traction-wheels, and a small gear-wheel $D^2$ on the end of the axle C, and a clutch F, slidingly connected with the axle C to engage the hub of the gear-wheel $D^2$, as required, to transmit power and motion from the traction-wheel to the rotating axle C.

A series of belt-wheels H, each having toothed flanges adapted to engage and move hay forward and upward from the rake-teeth, are fixed to the rotating shaft C at regular intervals of space to serve as fenders to keep hay from contact with the shaft, as required, to prevent clogging and to aid in taking hay from the rake-teeth and placing it upon the toothed belts upon the belt-wheels.

A series of toothed endless belts J are placed on the wheels H and over a roller K at the top end of an elevator-frame L, that is adjustably connected with the carriage in such a manner that the endless belts will carry hay from the toothed wheels H and deliver it upon a wagon to which the elevator is connected by means of the carriage-frame A.

M is a rake-head hinged to the axle $A^2$ and provided with a series of curved metal teeth 1 2 3 4 5.

N is a bar that has a stiff back joint or rule-joint at its center and is pivotally connected with the elevator-frame and an arm $N^2$, projecting from the end of the rake-head M in such a manner that in its normal condition the bar will retain the rake in position, as required, to gather hay from the ground.

$N^3$ is a rod connected with the bar N in such a manner that it will extend upward through a bearing at the top portion of the elevator-frame to be within reach of a person on a wagon, so that pulling upward thereon will bow the bar N forward and rock the rake-head M in its bearings, as required, to elevate the rake-teeth and retain the rake inoperative.

P is a rock-shaft in bearings fixed to the elevator-frame L and connected with the bar N by means of a link $P^2$ in such a manner that an arm $P^3$ at its lower end, in engagement with the clutch member F on the shaft C, will act in concert with the bar N and throw the gear-wheel D in and out of gear simultaneously with the movements of the rod $N^3$ and the rake.

We are aware belt-wheels have been provided with pins or arms projecting radially to prevent a belt from slipping off, and also for moving hay relative to a rake and elevator; but it is obvious that hay can readily pass inward between such radial arms to wrap upon the hubs of the wheels and to clog the movable belt upon the wheels, and that our manner of constructing belt-wheels by fixing toothed disks on the ends of the hubs to produce flanges will prevent such clogging.

Having thus described the construction of our machine and its practical operation when connected with a wagon, what we claim, and desire to secure by Letters Patent, is—

1. In a hay rake and loader, a series of belt-wheels, each having a continuous toothed flange at each end or side face and all the said wheels fixed to a rotating shaft, at regular spaces apart, to move hay from a rake toward an elevator and to prevent hay from clogging on said wheels, and toothed belts on said wheels for elevating the hay, arranged and combined as shown and described.

2. The combination of the jointed bar N, the rod $N^3$ the rake M having an arm $N^2$ at its end and an elevator-frame having a bearing for said rod at its side and top portion to raise and lower the rake-teeth in the manner set forth for the purposes stated.

3. The jointed bar N the rake-head M having an arm $N^2$ at its end, the rod $N^3$, the elevator-frame having a bearing for said rod at its side and top portion, the crank-shaft P and the gear-wheel D and clutch F on the shaft C, arranged and combined in a hay rake and elevator to simultaneously adjust the rake and the gear-wheel in the manner set forth for the purposes stated.

4. An improved hay rake and loader, comprising a carriage-frame, a carriage-axle fixed to said frame, traction-wheels loose on the ends of said axle, a rotating shaft in bearings fixed to the same frame in a lower plane than the carriage-axle, a series of belt-wheels having toothed flanges at their sides fixed to said rotating shaft, a rake-head having fixed curved teeth and an arm projecting vertically from one of its ends pivoted to the carriage-frame, an elevator-frame pivotally connected with the carriage frame and axle and provided with a bearing for a sliding rod at its top portion, toothed endless belts placed on the belt-wheels having toothed flanges, an internal gear fixed to one of the carriage-wheels, a smaller gear-wheel on the rotating shaft, a jointed bar pivotally connected to the elevator-frame and the arm of the rake-head, and a rod connected with said jointed bar and extended through the bearing connected with the elevator-frame, all arranged and combined as set forth for the purposes stated.

THOMAS G. THRELKELD.
JOHN H. THRELKELD.

Witnesses:
J. RALPH ORWIG,
THOMAS G. ORWIG.